US008549294B2

(12) United States Patent
Chowdhury et al.

(10) Patent No.: US 8,549,294 B2
(45) Date of Patent: *Oct. 1, 2013

(54) SECURING HOME AGENT TO MOBILE NODE COMMUNICATION WITH HA-MN KEY

(75) Inventors: Kuntal Chowdhury, Plano, TX (US); Anand Palanigounder, Plano, TX (US)

(73) Assignee: Apple Inc., Cupertino, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/374,941

(22) Filed: Jan. 24, 2012

(65) Prior Publication Data

US 2012/0151212 A1    Jun. 14, 2012

Related U.S. Application Data

(63) Continuation of application No. 11/104,916, filed on Apr. 13, 2005, now Pat. No. 8,126,148.

(60) Provisional application No. 60/562,263, filed on Apr. 14, 2004.

(51) Int. Cl.
*H04L 29/06* (2006.01)

(52) U.S. Cl.
USPC ......................................................... 713/168

(58) Field of Classification Search
USPC ......................................................... 713/168
See application file for complete search history.

(56) References Cited

U.S. PATENT DOCUMENTS

| 7,107,620 B2 | 9/2006 | Haverinen et al. |
| 2002/0001384 A1 | 1/2002 | Buer et al. |
| 2002/0044552 A1 | 4/2002 | Vialen et al. |
| 2002/0065785 A1 | 5/2002 | Tsuda |
| 2002/0083046 A1 | 6/2002 | Yamauchi et al. |
| 2002/0120844 A1* | 8/2002 | Faccin et al. .................. 713/168 |
| 2002/0178358 A1 | 11/2002 | Perkins et al. |
| 2003/0039234 A1 | 2/2003 | Sharma et al. |
| 2003/0159067 A1* | 8/2003 | Stirbu ........................... 713/201 |
| 2005/0025091 A1 | 2/2005 | Patel et al. |
| 2007/0038867 A1* | 2/2007 | Verbauwhede et al. ...... 713/186 |

FOREIGN PATENT DOCUMENTS

WO    2004003679 A2    1/2004

OTHER PUBLICATIONS

3rd Generation Partnership Project 2 (3GPP2), "Wireless IP Network Standard", 3GPP2 (Dec. 10, 1999).
Maughan, D., "RFC 2408: Internet Security Association and Key Management Protocol", Internet Society (1998).

(Continued)

*Primary Examiner* — Michael S McNally
(74) *Attorney, Agent, or Firm* — Meyertons, Hood, Kivlin, Kowert & Goetzel, P.C.

(57) ABSTRACT

The invention is a new protocol for securing the communication link between the Home Agent and the Mobile Node. A cipher key and an integrity key are generated at a home AAA server and are also generated independently at the Mobile Node. The two keys generated at the home AAA server are transmitted to the Home Agent to secure information packets transmitted between the Mobile Node and the Home Agent. The cipher key and integrity key are used to establish a security association used for information packet transmissions. The cipher key is used to encrypt the information packets, and the integrity key is used to ensure that the contents of the encrypted message are not altered.

31 Claims, 3 Drawing Sheets

(56) References Cited

OTHER PUBLICATIONS

Schaad, J., "RFC 3537: Mapping a Hashed Message Authentication Code (HMAC) with a Triple-Data Encryption Standard (DES) Key . . . ", Internet Society (May 2003).
Aboba, B., "RFC 3162: RADIUS and IPv6", Internet Society (Aug. 2001).
Rigney, C., "RFC 2865: Remote Authtentiction Dial in User Service (RADIUS)", Internet Society (Jun. 2000).
Gopal, Ram, "Security in the Mobile Internet", Nokia Research Center (Apr. 7-9, 2004).
"Security in IPv6", Native6 (2003).
Harkins, D. et al, "The Internet Key Exchange", Internet Society (Nov. 1998).
Notification of Transmittal of the International Search Report and the Written Opinion of the International Searching Authority; EPO (Sep. 15, 2005).
Floroiu, J.; "Security Framework for the Access Control of MIPv6 Mobile Nodes"; Internet Draft (May 2003).

* cited by examiner

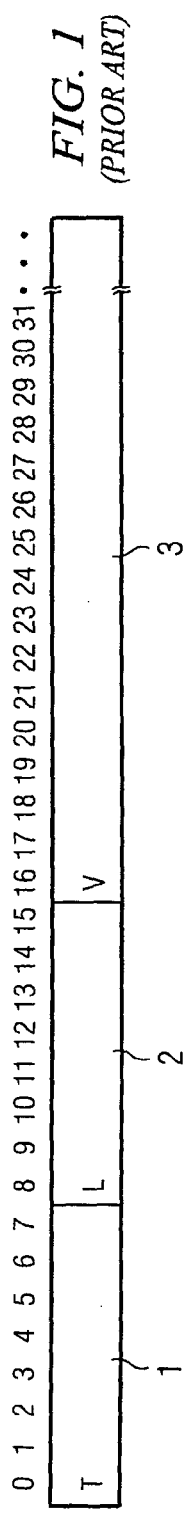
FIG. 1
(PRIOR ART)
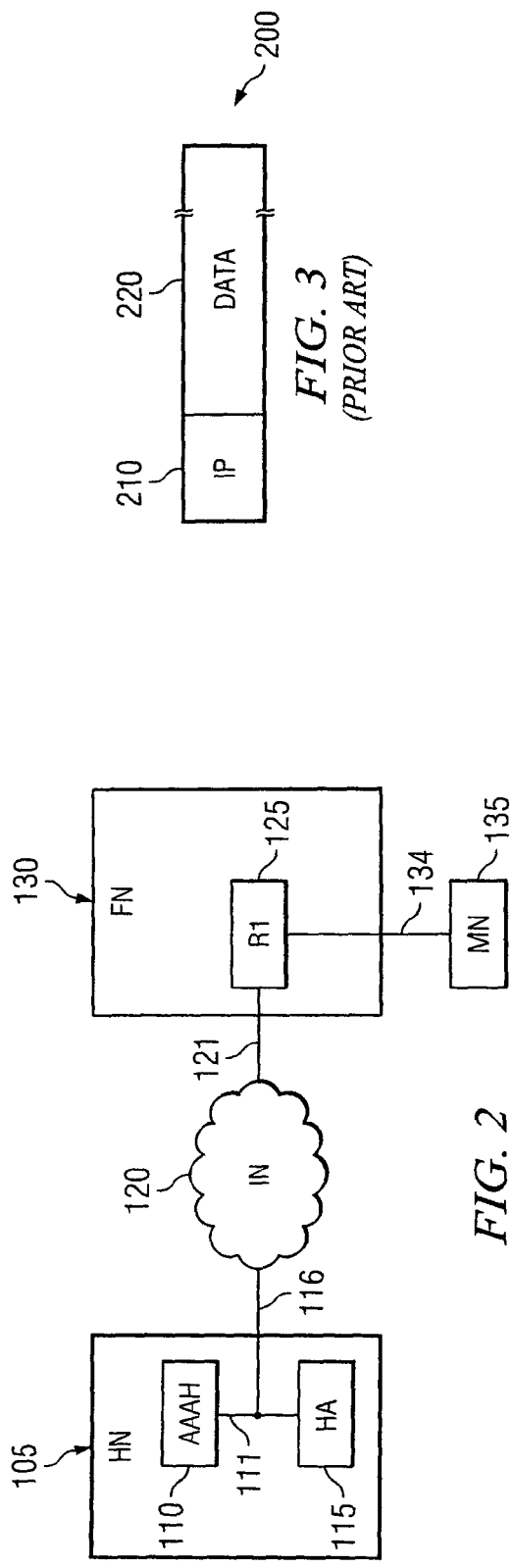
FIG. 2
FIG. 3
(PRIOR ART)
FIG. 7

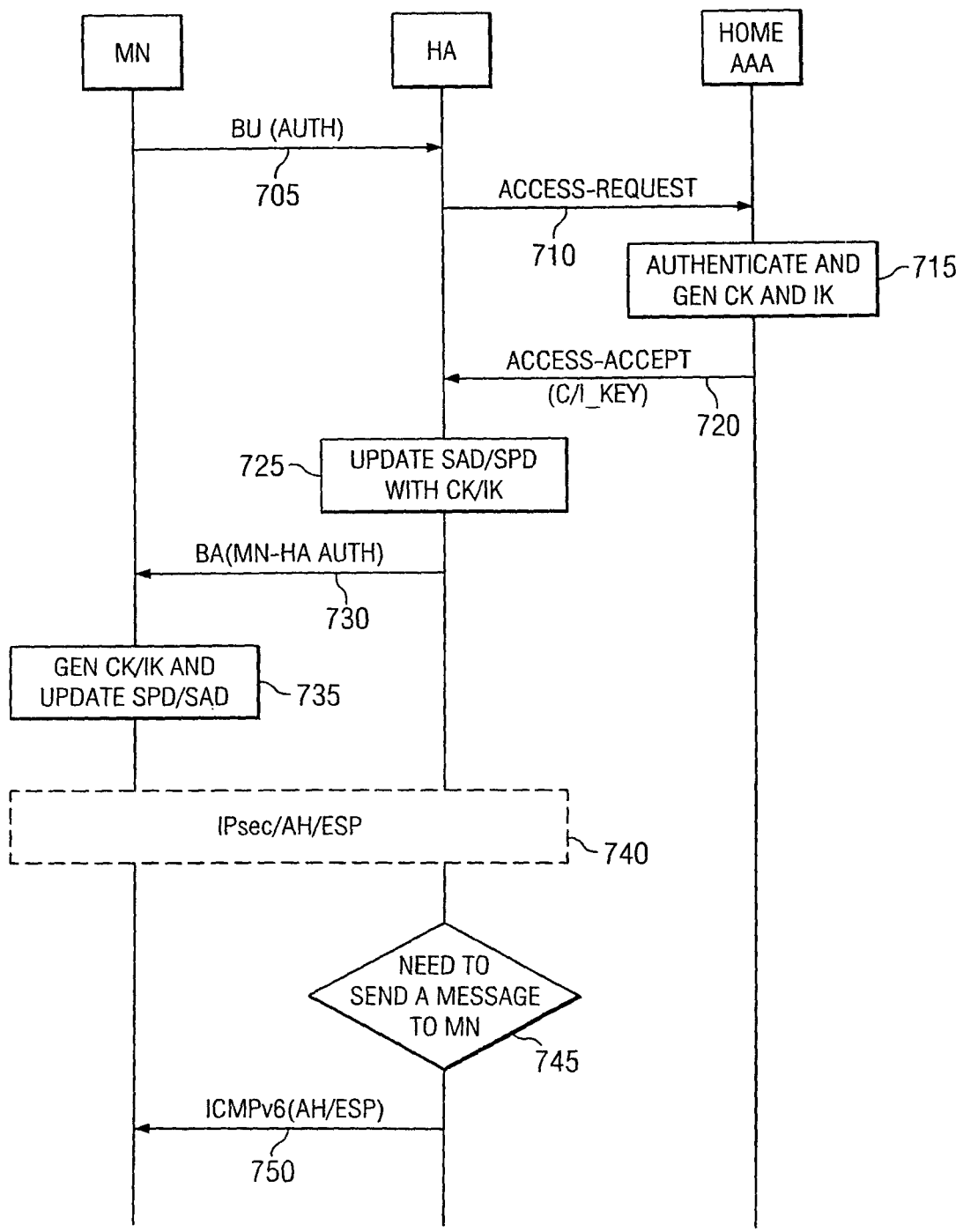

SECURING HOME AGENT TO MOBILE NODE COMMUNICATION WITH HA-MN KEY

RELATED APPLICATION DATA

This application is related to Provisional Patent Application Ser. No. 60/562,263 filed on Apr. 14, 2004, and Utility patent application Ser. No. 11/104,916 filed on Apr. 13, 2005, and priority is claimed for these earlier filings. These patent application are incorporated by reference into this utility patent application.

TECHNICAL FIELD OF THE INVENTION

A secure communication protocol using a cipher key and an integrity key to secure a packet-based mobile communication system.

BACKGROUND OF THE INVENTION

Present-day Internet communications represent the synthesis of technical developments begun in the 1960s. During that time period, the Defense Department developed a communication system to support communication between different United States military computer networks, and later a similar system was used to support communication between different research computer networks at United States universities.

The Internet

The Internet, like so many other high tech developments, grew from research originally performed by the United States Department of Defense. In the 1960s, Defense Department officials wanted to connect different types of military computer networks. These different computer networks could not communicate with each other because they used different types of operating systems or networking protocols.

While the Defense Department officials wanted a system that would permit communication between these different computer networks, they realized that a centralized interface system would be vulnerable to missile attack and sabotage. To avoid this vulnerability, the Defense Department required that the interface system be decentralized with no vulnerable failure points.

The Defense Department developed an interface protocol for communication between these different network computers. A few years later, the National Science Foundation (NSF) wanted to connect different types of network computers located at research institutions across the country. The NSF adopted the Defense Department's interface protocol for communication between the research computer networks. Ultimately, this combination of research computer networks would form the foundation of today's Internet.

Internet Protocols

The Defense Department's interface protocol was called the Internet Protocol (IP) standard. The IP standard now supports communication between computers and networks on the Internet. The IP standard identifies the types of services to be provided to users and specifies the mechanisms needed to support these services. The IP standard also describes the upper and lower system interfaces, defines the services to be provided on these interfaces, and outlines the execution environment for services needed in this system.

A transmission protocol, called the Transmission Control Protocol (TCP), was developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a sensible addressing scheme that reflects the internal organization of the network or sub-network. All information packets transmitted over the Internet will have a set of IP header fields containing this IP address.

A router is located on a network and is used to regulate the transmission of information packets into and out of computer networks and within sub-networks. Routers are referred to by a number of names including Home Agent, Home Mobility Manager, Home Location Register, Foreign Agent, Serving Mobility Manager, Visited Location Register, and Visiting Serving Entity. A router interprets the logical address of an information packet and directs the information packet to its intended destination. Information packets addressed between computers on the sub-network do not pass through the router to the greater network, and as such, these sub-network information packets will not clutter the transmission lines of the greater network. If an information packet is addressed to a computer outside the sub-network, the router forwards the packet onto the greater network.

The TCP/IP network includes protocols that define how routers will determine the transmittal path for data through the network. Routing decisions are based upon information in the IP header and entries maintained in a routing table. A routing table possesses information for a router to determine whether to accept the communicated information packet on behalf of a destination computer or pass the information packet onto another router in the network or sub-network. The routing table's address data enables the router to accurately forward the information packets.

The routing table can be configured manually with routing table entries or with a dynamic routing protocol. In a dynamic routing protocol, routers update routing information with periodic information packet transmissions to other routers on the network. This is referred to as advertising. The dynamic routing protocol accommodates changing network topologies, such as the network architecture, network structure, layout of routers, and interconnection between hosts and routers. Internet Control Message Protocol (ICMP) information packets are used to update routing tables with this changing system topology.

The IP-Based Mobility System

The Internet protocols were originally developed with an assumption that Internet users would be connected to a single, fixed network. With the advent of portable computers and cellular wireless communication systems, the movement of Internet users within a network and across network boundaries has become common. Because of this highly mobile Internet usage, the implicit design assumption of the Internet protocols has been violated.

In an IP-based mobile communication system, the mobile communication device (e.g. cellular phone, pager, computer, etc.) is called a mobile node. Typically, a mobile node changes its point of attachment to a foreign network while maintaining connectivity to its home network. A mobile node may also change its point of attachment between sub-networks in its home network or foreign network. The mobile node will always be associated with its home network and sub-network for IP addressing purposes and will have information routed to it by routers located on the home and foreign network. Generally, there is also usually a correspondence node, which may be mobile or fixed, communicating with the mobile node.

IP Mobility Protocols

During the formative years since the Internet was first established, Internet Protocol version 4 (IPv4) was recognized and adopted as the standard version of the Internet Protocol. With the advent of mobile IP and proliferation of computers and computer systems linked to the Internet, various limitations in the IPv4 standard and associated procedures have developed and emerged. In response, new standards are evolving and emerging.

The most pressing limitation in the IPv4 standard is the restriction on the number of possible IP addresses imposed by the 32-bit address field size. A newer standard, the Internet Protocol version 6 (IPV6), increases the size of the available address space 400% to 128 bits, which vastly increases the number of available addresses. While the 32-bit address field provides 232 or approximately 4 billion IP address possibilities, a 128-bit field provides 2128 (340×1012) IP address possibilities.

A number of benefits emerge from this vastly larger available address field. First, there is little chance of exhausting the number of IP addresses. Second, a large address field allows aggregation of many network-prefix routers into a single network-prefix router. Finally, the large address pool allows nodes to auto configure using simple mechanisms. One practical advantage as a result is elimination of designated foreign agents to route information packets to a visiting mobile node on a foreign network.

IP Mobility Care-of Addressing

In a mobile IP network, nodes will transmit notification and discovery information packets onto the network to advertise their presence on the network and solicit advertisements from other nodes. While on a foreign network, a mobile node will be assigned a care-of address that will be used to route information packets to the foreign network and the attached mobile node. An advertisement from a router on the foreign network will inform a mobile node that it is attached to a foreign network. The mobile node will typically create a care-of address on the foreign network, which it will transmit to its home network in an information packet to register the care-of address. Information packets addressed to the mobile node on the home network have the care-of address added. This information packet containing the care-of address will then be forwarded and routed to the mobile node on the foreign network by a router on the foreign network according to the care-of address.

Mobile IP Extensions

Extensions have been defined in the IP protocol, and extensions can be used in similar protocols, to support transmission of variable amounts of data in an information packet. This includes address information for mobile nodes, routers, and networks. The extension mechanism in IP permits appropriate addressing and routing information to be carried by any information packet, without restriction to dedicated message types such as discovery, notification, control, and routing information packet formats.

The IPv6 header minimizes header overhead. Compared to IPv4, nonessential fields and option fields have been moved to extension headers inserted after the IPv6 header. The extension header mechanism of IPv6 is part of the data payload so that intermediate routers are not affected by processing the extension headers.

The general extension format is found in FIG. 1 in a Type-Length-Value format. As shown in FIG. 1, the Type data field (T) 1 occupies the first 8-bits (one octet) of the general extension. The value of this data field will designate the type of extension. The Length data field (L) 2 occupies the next 8-bits of the extension, and the value assigned is the length of the Value field (V) 3 in octets. The Value data field 3 occupies the remaining bits in the general extension as specified by the Type 1 and Length 2 data values.

Mobile IPv6 Movement Detection and Binding

Upon moving to a new network, a mobile node detects its movement by receipt of a Router Advertisement message from a new router or exceeding the time interval for receiving an expected Router Advertisement message from a linked router. A mobile node can also periodically transmit a Router Solicitation message that will be received by a router on the foreign network and initiate transmission of a Router Advertisement message received by the mobile node.

The Router Advertisement message contains network prefix information that is used to form a care-of address for routing information packets from the home network to the mobile node on the foreign network. A Binding Update message (BU) is used to register the care-of address with the home agent and any active correspondence node communicating with the mobile node. The new binding includes the care-of address, the home address, and a binding lifetime. A Binding Acknowledgment message (BA) is sent in response to the Binding Update message to either accept or reject the Binding Update as an authentication step. A Correspondence Node can send a Binding Request message (BR) to a mobile node to discover the care-of address for the mobile node, and a Binding Update will typically be sent to the Correspondence Node in response. The Binding Request is generally used to refresh a binding nearing expiration of the designated lifetime of the binding. Routers on the networks will maintain the care-of address and home IP address association for the mobile node on a data table, ensuring that information packets can be routed to a mobile node connected to the foreign network.

Authentication, Authorization and Accounting ("AAA")

In an IP-based mobile communications system, the mobile node changes its point of attachment to the network while maintaining network connectivity. When a mobile node travels outside its home administrative domain, however, the mobile node must communicate through multiple domains in order to maintain network connectivity with its home network. While connected to a foreign network controlled by another administrative domain, network servers must authenticate, authorize and collect accounting information for services rendered to the mobile node. This authentication, authorization, and accounting activity is called "AAA", and AAA servers on the home and foreign network perform the AAA activities for each network.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server will also provide the accounting function including tracking usage and charges for use of transmissions links between administrative domains.

Another function for the AAA server is to support secured transmission of information packets by storing and allocating security associations. Security associations refer to those encryption protocols, nonces, and keys required to specify and support encrypting an information packet transmission between two nodes in a secure format. The security associations are a collection of security contexts existing between the nodes that can be applied to the information packets exchanged between them. Each context indicates an authentication algorithm and mode, a shared key or appropriate public/private key pair, and a style of replay protection.

RADIUS AAA

Remote Authentication Dial In User Service (RADIUS) is one widely utilized protocol for AAA. The RADIUS protocol defines message formats and data required for AAA that can be used on virtually any packet-based communication system. Functionally, RADIUS can perform client-server operations, network security, authentication, and accounting using standard information encoding under a UDP transmission protocol. RADIUS AAA server computers are widely deployed over wireless networks utilizing the RADIUS protocol to perform AAA functions.

Key-Based Cryptographic Systems

Encryption algorithms use keys to generate the numeric permutations of encrypted data. It is preferable that the key be known only to the appropriate or authorized parties to the communication. This type of key is known as a "secret key", and the sender and receiver of the information packet use the same secret key to encrypt and decrypt information packets with the algorithm. Public key encryption may also be supported by cryptographic security systems, where the sender and receiver have a public key and a private key. Messages may be encoded by the sender using the receiver's public key, and decoded by the receiver using the receiver's private key. Hybrid security systems are also used to encrypt and decrypt information in information packets. Accordingly, key-based security systems rely on the use of some type of secret key to support confidential communications.

Confidential Communications over a Public Network

Because information packets are routed over the public networks that make up the Internet, cryptographic security systems are used to send the communications in a confidential manner. These security systems maintain the confidentiality of the information packet by encoding, or encrypting, the information in the information packet. The transformation of the original data into a secure, encoded or encrypted format is accomplished using mathematical algorithms and keys. The encryption process can be reversed, or decoded, by an authorized person using the keys. Other activities performed by the security system include authentication (you are who you say you are), integrity checking (the information packet was sent in the decoded form), and non-repudiation (identification of the person sending the information packet).

A cryptographic security system consists of two fundamental components—a complicated mathematical algorithm for encrypting the information, and one or more values, called keys, known to the parties authorized to transmit or receive the information packet. The security associated with encryption is directly tied to the sophistication of the algorithm and keys. The cryptographic system will have a higher level of security the greater the complexity of the algorithm and keys. Because of its complexity, the algorithm can be kept secret or publicly disclosed without undermining the strength of the security system, which is fundamentally linked to the keys.

The goal of the encryption is to be computationally infeasible to break—derive the original data from the encrypted data—without exorbitant expenditures in cost or time to recover the data or keys. Using keys helps make the encryption more difficult to break. As an example of the encryption process, consider the situation where Party A intends to communicate confidentially with Party B using the cryptographic system. First, Party A uses the algorithm and a key to transform the information in the transmitted information packet into encrypted information. In order to maintain the confidentiality of the transmitted information, the encrypted information does not resemble the information in the original information packet, and the encrypted information cannot be easily decoded into its original form without the use of the algorithm and a key.

As such, the encrypted information is transmitted over the public networks on the Internet to Party B without disclosing the content of the original information packet. After receiving the encrypted information packet, Party B decodes the encrypted information using the algorithm and a key. When the encrypted information is decoded, the original information should be disclosed in the decoded information packet.

Security System for the IP-Based Mobile System

In an IP-based mobile communications system, the Mobile Node changes its point of attachment to the network while maintaining network connectivity. Security concerns arise in the mobile system because authorized users are subject to the following forms of attack: (1) session stealing where a hostile node hijacks the network session from mobile node by redirecting information packets, (2) spoofing where the identity of an authorized user is utilized in an unauthorized manner to obtain access to the network, and (3) eavesdropping and stealing of information during a session with an authorized user. No separate secure network exists in the IP-based mobility communications system, and therefore, it is necessary to protect information transmitted in the mobile system from the above-identified security attacks.

In Mobile IP, the memory and data overhead for encryption can be significant and burdensome. Prior art encryption protocols under the Internet Protocol Security (IPSec) standard depend on performing an IPSec Key Exchange (IKE) protocol. The IKE protocol negotiates the protocols, encryption algorithms, and encryption keys used. However, IKE increases setup time, is more expensive over a wireless link, and does not allow for dynamic security associations. The present invention improves the security of communications in an IP-based mobile communications system by creating a lightweight cipher key and integrity protection key generation method to protect mobile IP signals in place of IKE.

SUMMARY OF THE INVENTION

The invention is a new protocol for securing the communication link between the Home Agent and the Mobile Node. Under the invention, a cipher key and an integrity key are generated at a home AAA server and are also generated independently at the Mobile Node. The two keys generated at the home AAA server are distributed back to the Home Agent to use to secure information packets transmitted between the Mobile Node and the Home Agent. The cipher key is used to encrypt the information packets, and the integrity key is used to ensure that the contents of the encrypted message are not altered.

The Binding Update message from the Mobile Node identifies the shared secret that is to be used for authentication and authorization. Upon receipt at the AAA server in an Access-Request message, the AAA server separately generates a cipher key and an integrity key using the shared secret that was identified in the Binding Update message in an algorithm. The cipher key and integrity key are communicated back to the Home Agent. Similarly, the Mobile Node also uses the same shared secret separately to generate the same cipher key and an integrity key using the same algorithm that was used by the AAA server. In subsequent messages between the Home Agent and the Mobile Node, these keys are used to secure communication between the Mobile Node and the Home Agent. The cipher key is used to encrypt information packets, and the integrity key is used to confirm the packet contents have not been tampered with.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 1 is a general extension format;

FIG. 2 is a diagram of a mobile IP wireless communication network compatible with Mobile IPv6;

FIG. 3 is the general format for an information packet;

FIG. 7 is a Binding Acknowledgement message; and

FIG. 8 is the message flow of the invention for generating and communicating the cipher and integrity key.

DESCRIPTION OF THE PREFERRED EMBODIMENTS

Figure 4:
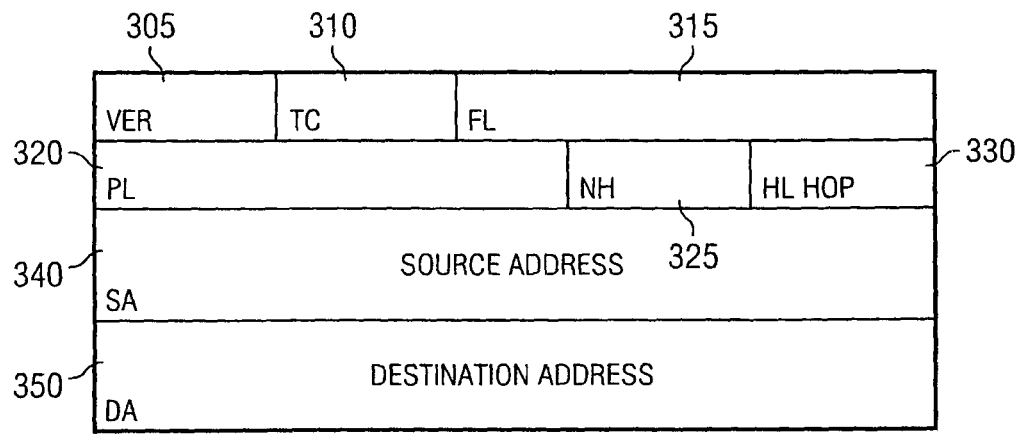
FIG. 4 is the format for an IPv6 Header.

FIG. 2 shows an embodiment for a mobile IP cellular communication network compatible with Mobile IPv6 that can use the invention. A home network 105 consists of a home Authentication, Authorization, and Accounting (AAAH) server 110. The AAAH 110 is connected to the home agent 115 (HA) by communication link 111. Communication link 116 connects the AAAH 110 and HA 115 to the Internet 120. Router 1 (R1) 125 on the Foreign Network (FN) 130 connects to the Internet 120 using communication link 121. The Mobile Node (MN) 135 is coupled to R1 125 using communication link 134. The Mobile Node 135 can be a communication device, such as a cellular phone, a computer, a router, a personal data assistant (PDA) and handheld terminal, or some other type of host. The communication link 134 can be a wireless or wired communication link.

The Mobile Node 135 is associated with the Home Agent 115. Information packets sent to the Mobile Node 135 on the home network 105 are routed to the Mobile Node 135 while linked to the foreign network 130. The Home Agent 115 stores an address association in its memory corresponding to the location of the Mobile Node 135 on the foreign network 130. The address association includes the Internet Protocol address of the Mobile Node 135 on the home network 105 and the care-of address corresponding to the topological location of the R1 125. As the Mobile Node 135 moves from network to network, the various routing tables and other data tables must be updated to maintain communication with the Mobile Node 135 thereby ensuring the correct routing of information packets.

When Mobile Node 135 movement results in a change in connectivity, the Mobile Node's 135 care-of address must be updated so that the correct router associations on both the home agent 115 and the R1 125 are maintained. Hand-off procedures involve assignment of a care-of address for the home agent 115 to transmit an information packet through the Internet 120, so that the R1 125 can route the information packet to the connected Mobile Node 135.

The general format of an information packet used on packet-based communication systems is shown in FIG. 3. Information packets use an encoding format of "1" and "0" data bits to build a data stream that a computer can interpret. The information packet 200 has an IP address header 210 that provides routing instructions for transport over an IP communication system. The actual length and configuration of the IP header 210 is dependent on the actual communication protocol being used (e.g. IPv4 or IPv6). The information packet 200 also contains a variable length data field 220 that contains the actual information being transmitted from the originating source to the destination source.

FIG. 4 is the IP header format for the IPv6 protocol. The Version (V) 4-bit data field 305 has a value of "6" and designates the header as an IPv6 protocol packet. The Traffic Class (TC) 8-bit data field 310 is available to identify and distinguish between different classes or priorities of IPv6 packets. The Flow Label (FL) 20-bit data field 315 is used by a source to label sequences of packets for special handling by routers. The Payload Length (PL) 16-bit data field 320 specifies the length of the IPv6 payload in octets or bytes. The Next Header (NH) 8-bit data field 325 identifies the type of header immediately following the IPv6 header. The Hop Limit (HL) 8-bit data field 330 is decremented by 1 for each node that forwards the packet. If the field value reaches zero, then the packet is discarded. The Source Address (SA) 128-bit data field 340 contains the IP address of the originator of the packet, and the Destination Address (DA) 128-bit data field 350 contains the IP address of the intended recipient of the packet.

Figure 5:
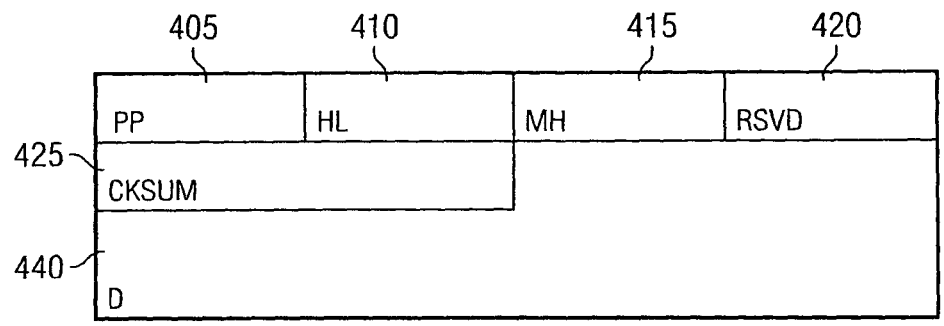
FIG. 5 is the general format for a Mobility Header payload extension.

FIG. 5 is the general format for a Mobility Header payload extension as used in the invention. The Mobility Header is inserted after the IPv6 Header. The Payload Proto (PP) 8-bit data field 405 identifies the type of header immediately following the Mobility Header. The Header Length (HL) 8-bit data field 410 is the length of the Mobility Header in octets or bytes, excluding the first 8 bytes. The MH Type data field 415 identifies the particular mobility message. The Reserved (RSVD) 8-bit field 420 is reserved for future use. The Checksum (CKSUM) 16-bit data field 440 is calculated from the octet string consisting of a "pseudo-header" followed by the entire Mobility Header and is the complement sum of the string. The Message Data (D) variable length data field 440 contains the data specific to the message being communicated to the node.

Figure 6:
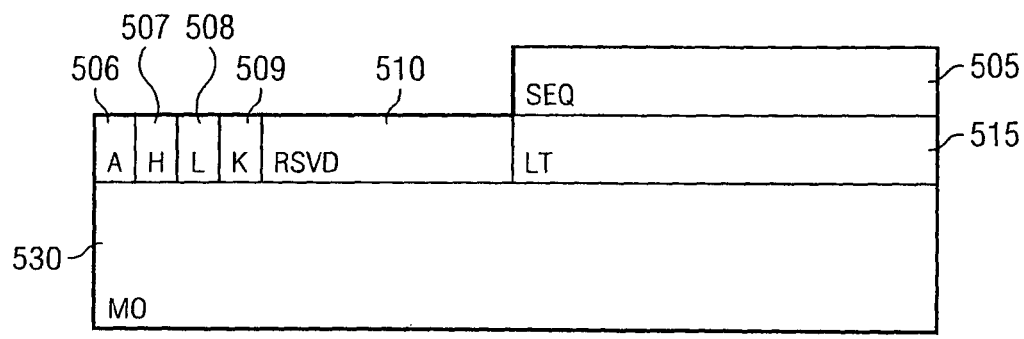
FIG. 6 is a Binding Update message.

FIG. 6 shows a Binding Update message (BU) extension format used in the invention. This extension occupies the Message Data data field of FIG. 5. The Sequence Number (SEQ) 16-bit data field 505 is used to sequence Binding Updates received by a receiving node and to match a returned Binding Acknowledgement by a sending node. The Acknowledge (A) one-bit data field 506 is set by the sending mobile node to request a Binding Acknowledgement. The Home Registration (H) one-bit data field 507 is set by the mobile node to request that the receiving node should act as the mobile node's home agent. The Link-Local Address Capability (L) one-bit data field 508 is set when the reported home address has the same interface identifier as the mobile node's link-local address. The Key Management Mobility Capability (K) one-bit data field 509, if cleared, indicates that the protocol for establishing IP security associations between the mobile node and the home agent does not survive movements. This bit is valid only for Binding Updates sent to the home agent. The Reserved (RSVD) 8-bit field 510 is reserved for future use. The Lifetime (LT) 16-bit data field 520 indicates the number of time units remaining before the binding expires. Each time unit is four seconds. The Mobility Options (MO) variable-length data field 530 contains any mobility options. The care-of address can be specified in either the Source Address field of the IPv6 header or in the mobility option data field.

FIG. 7 shows a Binding Acknowledgment message (BA) extension format used in the invention. The extension occupies the Message Data data field of FIG. 5. The Status (S) 8-bit data field 605 indicates the disposition of the Binding Update message, with values of less than 128 indicating that the BU message was accepted by the receiving node. The Key Management Mobility Capability (K) one-bit data field 610, if cleared, indicates that the protocol for establishing IP security associations between the mobile node and the home agent does not survive movements. The Reserved (RSVD) 8-bit field 615 is reserved for future use. The Sequence Number (SEQ) 16-bit data field 620 is copied from the Sequence Number field in the BU and is used by the mobile node to match the BA with an outstanding BU. The Lifetime (LT) 16-bit data field 625 indicates the number of time units remaining before the binding expires. Each time unit is four seconds. The Mobility Options (MO) variable-length data field 630 contains any mobility options. The care-of address can be specified either in the Source Address field of the IPv6 header or in the mobility option data field.

FIG. 8 shows the message flow used in the invention. In step 705, a BU message is generated by a MN containing an Authenticator (AUTH) option. This Authenticator option can either be a MN-HA or MN-AAA authenticator generated using either a MN or AAA "shared secret" respectively. The Authenticator is generated at the Mobile Node by an algorithm using a seed value that is generated from all or part of the Mobility Header of the selected extension option that is included in the BU message and a shared secret shared either between the Mobile Node and the Home Agent (e.g. MN-HA SS) or a shared secret between the Mobile Node and the AAA server (e.g. MN-AAA SS) using an one-way hash algorithm such as HMAC_SHA1, HMA_MD5, MD5, or SHA_1, or their variants.

The shared secret is a long-term value that is not changed over time. The MN will be provisioned with the shared secret upon initial subscription to the communication service. If the Authenticator is a MN-HA SS, the Home Agent uses the shared secret to authenticate the BU message based on this shared security association between the MN and the HA by using the same one-way hash algorithm to derive the MN-HA authenticator value and authenticate the BU by comparing the authenticator values. Otherwise, the shared secret is a MN-AAA SS with the secret shared between the MN and the AAAH, and the AAAH will perform the authentication to generate and compare the MN-AAA authenticator values. If the generated authenticator values do not match, then the message is rejected as not authenticated.

In step 710, the HA generates and transmits an Access-Request message to the AAAH. If the shared secret is a MN-AAA shared secret, the Access-Request message will include the MN-AAA Authenticator which the AAAH uses to authenticate the message. In step 715, the AAAH authenticates the MN by calculating the authenticator value using the same procedure as used by the MN, to compare and authorize access to the network. A cipher key and integrity key are then generated using the same shared secret (e.g. either the MN-AAA SS or MN-HA SS) and the seed value that is generated from all or part of the Mobility Header of the selected extension option that is included in the BU message. The two keys are generated using a one-way hash algorithm and are at least 128-bits in length. Alternatively or additionally, the AAAH can generate the random numbers to use as seed values for generating the keys. In step 720, the AAAH generates and transmits an Access-Accept message to the HA that includes the calculated cipher and integrity keys and the random numbers if random numbers generated by the AAAH are used as (or used to calculate) the seed values. Otherwise, the Mobility Header of the selected extension option that is included in the BA message (which is same as the one in the initial BU message) is sufficient for the MN to calculate the same seed value.

In step 725, the HA updates its Security Policy Database (SPD) and Security Association Database (SAD) with the cipher key (CK) and integrity key (IK) and the MN's address and the HA's address. In step 730, a Binding Acknowledgement message (BA) is sent back to the MN that is secured using an authenticator generated using the IK as a shared secret. Furthermore, the IK will be used to generate an authenticator value for all subsequent messages between the HA and the MN for a given Home Registration session. The BA will also include the random numbers if the random numbers generated by the AAAH are used as (or used to calculate) the seed values. Otherwise, the MN calculates the seed values used for deriving CK and IK keys from the Mobility Header of the selected authentication option extension filed using same procedures as the HA.

In step 735, the MN performs the same calculations to generate the CK and IK and updates its SPD and SAD associations. In step 740, based on the CK and IK values, the MN and the HA respectively establish the IPSec Security Associations based on the generated keys. In step 745, the HA determines that a message must be sent to the MN to update routing or other data information. In step 750, an ICMP message that includes an Authentication Header (AH) and Encapsulating Security Payload (ESP) headers as part of the IPSec is generated by the HA and transmitted to the MN for processing by the MN using the previously established Security Association at the HA. Similarly, the Security Association established at the MN is used to secure information packets transmitted from the MN to the HA. Alternatively, the HA and MN may use CK for confidentiality protection (using any encryption algorithm) and/or IK for integrity protection (using any integrity algorithm) in an embodiment other than IPSec.

The IK and CK are generated at the AAAH server according to the following algorithm:

IK=PRF (Shared Secret, "IK_SEED", HA Address, Home Address)

CK=PRF (Shared Secret, "CK_SEED", HA Address, Home Address)

Where:

CK_SEED and IK_SEED are different arbitrary strings of random information that is also known to the MN or can be derived by the MN.

PRF is a Pseudo Random Function and can be any one-way hash function such as HMAC_SHA1 and MD5.

HA is the IP address of the Home Agent

Home Address is the Home Address of the Mobile Node

Shared Secret is the MN-AAA or MN-HA shared secret

NOTE: The order of inputs to the PRF is interchangeable, but the same order must be used also at the MN. One or more (but not all) inputs can be omitted at both ends (i.e., MN and HA).

The IK and CK are also generated at the MN according to the following algorithm:

IK=PRF (Shared Secret, "IK_SEED", HA Address, Home Address)

CK=PRF (Shared Secret, "CK_SEED", HA Address, Home Address)

Where:
CK_SEED and IK_SEED are different arbitrary strings of random information that is also known to the AAAH or can be derived by AAAH.

PRF is a Pseudo Random Function and can be any one-way hash function such as HMAC_SHA1 and MD5.

HA is the IP address of the Home Agent

Home Address is the Home Address of the Mobile Node

Shared Secret is the MN-AAA or MN-HA shared secret

NOTE: The order of inputs to the PRF is interchangeable, but the same order must be used also at the HA. One or more (but not all) inputs can be omitted at both ends (i.e., MN and HA).

The IK transmitted back to the HA and the IK generated at the MN is used in a Message Authentication Code (MACs), also called a "keyed hash", to verify the integrity of the Binding Acknowledgment message. The BA message is processed using the IK and an algorithm to derive a MAC value. The MAC value is transmitted in the information packet as a MAC Authentication Option. Once the packet arrives, the message data is processed to calculate the MAC value for the data and compare that calculated value to the MAC Authentication Option. If the values differ, the message has been altered. The MAC calculation can be performed either before or after encryption.

The CK transmitted back to the HA and the CK generated at the MN is used to encrypt the information packets and is the basis of the SA established and used by the HA and the MN. The established SA secures the information packets transmitted between the MN and the HA for all subsequent information packet transmissions in the communication session.

Having described the invention, we claim:

1. A method of operating a home agent to establish a secured information packet communication between a mobile node in a first network and the home agent in a second network, the method comprising:
    the home agent receiving a binding update message from a mobile node, the binding update message containing an authenticator;
    the home agent sending an authentication request message to server on the second network, the authentication request message containing the authenticator; and
    the home agent receiving an authentication response message from the server;
    the home agent determining the cipher key and the integrity key from the authentication response message; and
    the home agent sending a binding acknowledgement message to the mobile node.

2. The method of claim 1, wherein the binding update message is a Mobile IP Version 6 (MIPv6) binding update message.

3. The method of claim 1, wherein the authentication request message comprises an access request message.

4. The method of claim 1, wherein the authentication response message comprises an access accept message.

5. The method of claim 1, further comprising:
    receiving further messages from the mobile node;
    authenticating the further messages using the integrity key; and
    decoding the further messages using the cipher key.

6. The method of claim 1, further comprising:
    encoding messages for the mobile node using the cipher key; and
    sending the encoded messages, the encoded messages comprising the integrity key.

7. The method of claim 1, further comprising authenticating the mobile node using the authenticator before sending the authentication request message containing the authenticator to the server.

8. The method of claim 1, further comprising updating a security association database with an address of the mobile node, the cipher key and the integrity key.

9. The method of claim 1, further comprising updating a security policy database with an address of the mobile node, the cipher key and the integrity key.

10. The method of claim 1, wherein, in response to the home agent sending the authentication request message, the server is configured to authenticate the binding update message and generate a cipher key and an integrity key using a shared secret, and wherein the authentication response message comprises the cipher key and the integrity key.

11. A home agent operable to establish a secured information packet communication between a mobile node in a first network and the home agent in a second network, the home agent comprising:
    a message processor and a communication interface co-operable:
        to receive a binding update message from a mobile node, the binding update message containing an authenticator;
        to send an authentication request message to a server on the second network, the authentication request message containing the authenticator;
        to receive an authentication response message from the server;
        to determine a cipher key and an integrity key from the authentication response message; and
        to send a binding acknowledgement message to the mobile node.

12. The home agent of claim 11, wherein the binding update message is a Mobile IP Version 6 (MIPv6) binding update message.

13. The home agent of claim 11, wherein the authentication request message comprises an access request message.

14. The home agent of claim 11, wherein the authentication response message comprises an access accept message and the second shared secret comprises an integrity key.

15. The home agent of claim 11, wherein the message processor and the communication interface are further co-operable:
    to receive further messages from the mobile node;
    to authenticate the further messages using the integrity key; and
    to decode the further messages using the cipher key.

16. The home agent of claim 11, wherein the message processor and the communication interface are further co-operable:
    to encode messages for the mobile node using the cipher key; and
    to send the encoded messages to the mobile node, the encoded messages comprising the integrity key.

17. The home agent of claim 11, wherein the message processor and the communication interface are further co-operable to authenticate the mobile node using the authenticator before sending the authentication request message containing the authenticator to the server.

18. The home agent of claim 11, wherein the message processor is operable to update a security association database with an address of the mobile node, the cipher key and the integrity key.

19. The home agent of claim 11, wherein the message processor is operable to update a security policy database with an address of the mobile node, the cipher key and the integrity key.

20. A method of operating a mobile node to establish a secured information packet communication between the mobile node in a first network and a home agent in a second network, the method comprising:
- the mobile node generating an authenticator from a shared secret;
- the mobile node sending a binding update message to a home agent, the binding update message containing the authenticator;
- the mobile node receiving a binding acknowledgement message from the home agent; and
- the mobile node generating a cipher key and an integrity key from the shared secret.

21. The method of claim 20, wherein the binding update message is a Mobile IP Version 6 (MIPv6) binding update message.

22. The method of claim 20, further comprising:
- receiving further messages from the home agent; authenticating the further messages using the integrity key; and decoding the further messages using the cipher key.

23. The method of claim 20, further comprising:
- encoding messages for the home agent using the cipher key; and
- sending the encoded messages, the encoded messages comprising the integrity key.

24. The method of claim 20, further comprising updating a security association database with an address of the mobile node, the cipher key and the integrity key.

25. The method of claim 20, further comprising updating a security policy database with an address of the mobile node, the cipher key and the integrity key.

26. A mobile node operable to establish a secured information packet communication between the mobile node in a first network and a home agent in a second network, the mobile node comprising a message processor and a communication interface co-operable:
- to generate an authenticator from a shared secret;
- to send a binding update message to a home agent, the binding update message containing the authenticator;
- to receive a binding acknowledgement message from the home agent; and
- to generate a cipher key and an integrity key from the shared secret.

27. The mobile node of claim 26, wherein the binding update message is a Mobile IP Version 6 (MIPv6) binding update message.

28. The mobile node of claim 26, wherein the message processor and the communication interface are further co-operable:
- to receive further messages from the home agent; to authenticate the further messages using the integrity key; and to decode the further messages using the cipher key.

29. The mobile node of claim 26, wherein the message processor and the communication interface are further co-operable:
- to encode messages for the home agent using the cipher key; and
- to send the encoded messages to the home agent, the encoded messages comprising the integrity key.

30. The mobile node of claim 26, wherein the message processor is further operable to update a security association database with an address of the mobile node, the cipher key and the integrity key.

31. The mobile node of claim 26, wherein the message processor is further operable to update a security policy database with an address of the mobile node, the cipher key and the integrity key.

\* \* \* \* \*